Figure 1:
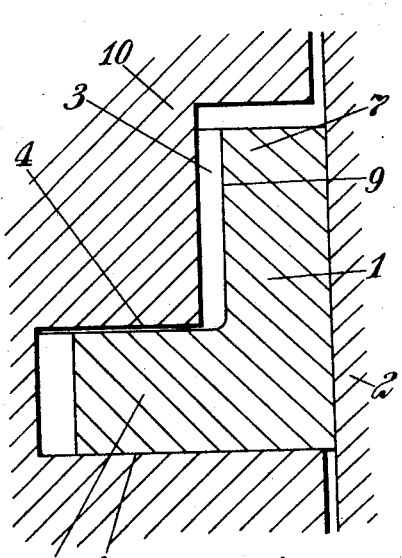

Sept. 4, 1951  P. DE K. DYKES  2,566,603

PISTON RING

Filed Dec. 2, 1948

Inventor
Paul DeKantzow Dykes
by
His Attorney

Patented Sept. 4, 1951

2,566,603

UNITED STATES PATENT OFFICE 2,566,603

PISTON RING

Paul de Kantzow Dykes, Cambridge, England, assignor to The Motor Industry Research Association, Brentford, England Application December 2, 1948, Serial No. 63,018
In Great Britain December 18, 1947

5 Claims. (Cl. 309—44)

This invention relates to internal combustion engines and more particularly to the construction of pistons and piston rings for use in such engines.

In reciprocating internal combustion engines the volume of gas leaking past the piston rings which is generally known as "blow-by" is normally small until the engine speed rises to a certain value, which value depends mainly on ring and piston design and on engine load. If the speed is further increased, the volume of "blow-by" increases very rapidly causing loss of power, interference with cylinder lubrication, and ring deterioration, which, in some engines, results in ring breakage. It has been shown that this phenomenon, which is commonly known as "piston ring flutter," does not consist of a vibratory movement in the ordinary sense but is due to a radial collapse of the ring during a definite period of each engine cycle.

The main object of the present invention is to avoid this excessive "blow-by" at high engine speeds.

The invention accordingly consists in an internal combustion engine wherein the piston ring and its groove are so shaped in cross section with respect to one another that if the ring moves axially in its groove under inertia forces the gas pressure on an adequate proportion of the inner surface of the ring remains substantially at the same value as the pressure of the gas attempting to leak past the ring, the resulting gas force acting on the inner surface of the ring being sufficient, when considered in conjunction with the stiffness of the ring, to prevent the radial collapse of the ring due to the force exerted by gas seeping between the outer surface of the ring and the cylinder wall.

According to the preferred arrangement, the piston ring and its groove are each provided with an adjacent surface intermediate between their top and bottom surfaces and disposed in a plane substantially at right angles to the cylinder axis, whereby contact between the said adjacent surfaces limits the upward movement of the ring and ensures that there is always adequate clearance between the top of the ring and the top of the groove to provide the necessary path for gas flow to the inner surface of the ring, it being understood that the arrangement is such that the gases in the combustion chamber are presumed to act on the top of the piston.

With this arrangement a suitable gas pressure is maintained over the whole inner surface of the ring when the ring is at the lower limit of its axial travel or over an adequate proportion of the inner surface when the ring is at the upper limit of its axial travel.

The invention will be more completely understood from the following detailed description which is given in conjunction with the accompanying drawings, in which:

Figures 1, 2, 3 and 4 are sectional views in elevation of four modified forms of the invention, showing in each case part of a piston ring with its associated groove.

Figure 2:
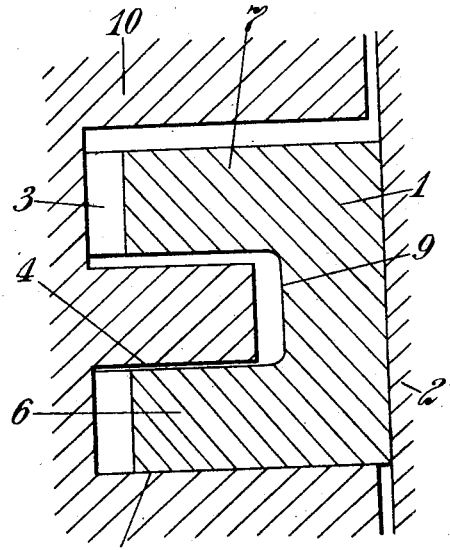
Figure 3:
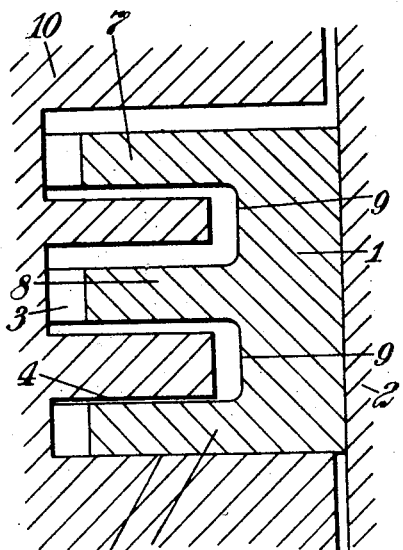

Referring now to these drawings, the piston ring 1 is constructed in a substantially L-shaped cross section as shown in Figure 1, or if preferred and in order to employ a more symmetrical cross section for the ring, the ring may be constructed in a substantially U-shaped or W-shaped cross section, as shown in Figure 2 or 3, with the arms of the U or the W pointing inwards, and the base of the U or the W making contact with the cylinder wall 2. In either case the piston 10 is provided with a stepped groove 3 suitably shaped to correspond with the cross section of the ring, the relative dimensions of the ring and its groove being such that only the upper and lower surfaces 4 and 5 of the lower arm 6 of the ring 1 come into contact with the walls of the groove 3, while adequate clearance is left between the upper portion 7 of the ring and the walls of the groove 3 to provide the necessary path for the gas flow to the inner surface 9 of the ring, a similar clearance being left between the centre portion 8 of the ring and the walls of the groove 3 in the case of the arrangement shown in Figure 3.

Figure 4:
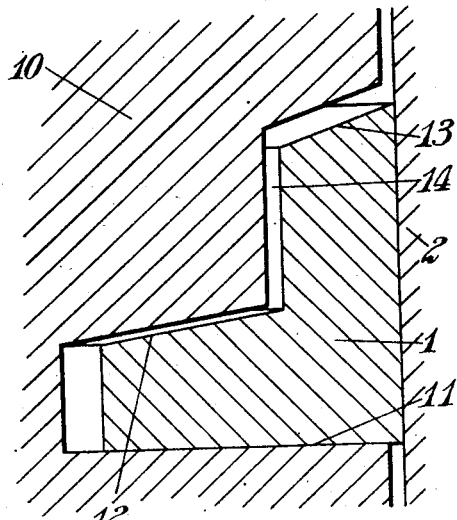

In the modification shown in Figure 4, the invention is shown applied to a wedge-shaped piston ring, the ring being of L-shaped cross section but having the inwardly extending surfaces 11 and 12 converging as shown, the upper part of the ring also having a sloping surface 13. The piston 10 is provided with a stepped groove 14 conforming in shape with that of the piston ring, the required clearance for the gas flow being provided between the surface 13 of the upper part of the ring and the groove as in the case of the arrangement shown in Figure 1. The most satisfactory results are shown if the angle subtended between the surfaces 11 and 12 is approximately 10° while the angle subtended between the surfaces 11 and 13 is approximately 20°.

I claim:

1. A piston and ring assembly for use in an internal combustion engine, wherein the piston ring and its groove are provided with adjacent surfaces intermediate their top and bottom surfaces and disposed in a plane substantially at right-angles to the cylinder axis, the relative dimensions of the ring and groove being such that if the ring moves axially in its groove under inertia forces, contact between said adjacent surfaces limits the upward movement of the ring and ensures an adequate clearance space between the top of the ring and the top of the groove which provides a sealed path for gas flow to the inner surface of the ring, whereby the resulting gas force acting on the inner surface of the ring is sufficient when considered in conjunction with the stiffness of the ring to prevent the radial collapse of the ring due to the force exerted by gas seeping between the outer surface of the ring and the cylinder wall.

2. A piston and ring assembly for use in an internal combustion engine, wherein the piston ring is of L-shaped cross section and the piston has a stepped groove so shaped as to correspond with the cross section of the ring, the relative dimensions of the ring and groove being such that if the ring moves axially in its groove under inertia forces the upper and lower surfaces of the lower arm of the ring make contact with the walls of the groove, while a clearance space is left between the upper part of the ring and the walls of the groove which provides a sealed path for gas flow to the inner surface of the ring, whereby the resulting gas force acting on the inner surface of the ring is sufficient when considered in conjunction with the stiffness of the ring to prevent the radial collapse of the ring due to the force exerted by gas seeping between the outer surface of the ring and the cylinder wall.

3. A piston and ring assembly for use in an internal combustion engine, wherein the piston ring is of U-shaped cross section and the piston has a stepped groove so shaped as to correspond with the cross section of the ring, the relative dimensions of the ring and groove being such that only the upper and lower surfaces of the lower arm of the ring make contact with the walls of the groove, so that if the ring moves axially in its groove under inertia forces adequate clearance is provided between the upper part of the ring and the walls of the groove to provide a path for gas flow to the inner surface of the ring, whereby the resulting gas force acting on the inner surface of the ring is sufficient when considered in conjunction with the stiffness of the ring to prevent the radial collapse of the ring due to the force exerted by gas seeping between the outer surface of the ring and the cylinder wall.

4. A piston and ring assembly for use in an internal combustion engine, wherein the piston ring is of W-shaped cross section and the piston has a stepped groove so shaped as to correspond with the cross section of the ring, the relative dimensions of the ring and groove being such that only the upper and lower surfaces of the lower arm of the ring make contact with the walls of the groove, so that if the ring moves axially in its groove under inertia forces adequate clearance is provided between the upper part of the ring and the walls of the groove to provide a path for gas flow to the inner surface of the ring, whereby the resulting gas force acting on the inner surface of the ring is sufficient when considered in conjunction with the stiffness of the ring to prevent the radial collapse of the ring due to the force exerted by gas seeping between the outer surface of the ring and the cylinder wall.

5. A piston and ring assembly for use in an internal combustion engine, wherein the piston ring is of wedge-shaped cross section and the piston has a stepped groove so shaped as to correspond with the cross section of the ring, the relative dimensions of the ring and groove being such that only the upper and lower surfaces of the lower arm of the ring make contact with the walls of the groove, so that if the ring moves axially in its groove under inertia forces adequate clearance is provided between the upper part of the ring and the walls of the groove to provide a path for gas flow to the inner surface of the ring, whereby the resulting gas force acting on the inner surface of the ring is sufficient when considered in conjunction with the stiffness of the ring to prevent the radial collapse of the ring due to the force exerted by gas seeping between the outer surface of the ring and the cylinder wall.

PAUL DE KANTZOW DYKES.

REFERENCES CITED

The following references are of record in the file of this patent:

UNITED STATES PATENTS

| Number | Name | Date |
|---|---|---|
| 1,595,855 | Clark | Aug. 10, 1926 |
| 1,737,056 | Mueller | Nov. 26, 1929 |
| 1,740,812 | Farmer | Dec. 24, 1929 |
| 1,984,409 | Godron | Dec. 18, 1934 |
| 2,048,258 | Godron | July 21, 1936 |
| 2,048,633 | Eweis | July 21, 1936 |
| 2,228,495 | Williams | Jan. 14, 1941 |
| 2,260,031 | Johnston | Oct. 21, 1941 |

FOREIGN PATENTS

| Number | Country | Date |
|---|---|---|
| 447,220 | Great Britain | 1936 |
| 534,119 | Great Britain | 1941 |